United States Patent Office 3,265,587
Patented August 9, 1966

3,265,587
PROCESS OF PURIFYING GLUCOSE OXIDASE
Susie Evelyn Doebbeling, Fairlawn, and James Walter Faucett, Wyckoff, N.J., assignors to Miles Laboratories, Inc., Elkhart, Ind., a corporation of Indiana
No Drawing. Filed May 25, 1964, Ser. No. 370,046
13 Claims. (Cl. 195—66)

This invention relates to a process for the production of purified glucose oxidase. More particularly, it relates to a process of removing sulfate impurities for solutions of glucose oxidase.

Glucose oxidase is an enzyme which has a large number of commercial applications. It is used for removing glucose or oxygen from various compositions and materials, such as the removal of glucose from egg whites prior to drying them. It is also used for removing oxygen from packaged, canned or bottled foods and beverages. An additional use is in diagnostic procedures and compositions for determining glucose content of body fluids, such as blood and urine. For many of these applications a highly pure glucose oxidase is not required. However, in some applications, such as diagnostic compositions, the glucose oxidase should be free of as many contaminating substances as possible. One such contaminating substance is sulfate impurity resulting from the use of ammonium sulfate to separate glucose oxidase during its production. When glucose oxidase is employed in colorimetric diagnostic tests, the sulfate impurity is believed to interfere with proper color development. Many complex procedures have been tried in the prior art to remove substantially all of this sulfate impurity, but such prior art techniques have either been unsuccessful or have been too complex for practical commercial use. Multiple pass dialysis has been tried but it is quite slow and time consuming and tends to lower the potency of the glucose oxidase.

It is an object of the present invention to provide a process for the production of glucose oxidase substantially free of sulfate impurities.

It is a further object of the present invention to provide a simplified process for removing sulfate impurities from glucose oxidase.

The enzyme glucose oxidase is known to be obtained by fermentation of *Aspergillus niger, Penicillium glaucum, Penicillium notatum, Penicillium chrysogenum, Penicillium purpurogenum, Aspergillus fumaricus* and the like in a carbohydrate-containing substrate also containing proper nutrients for fungal growth. The mycelium resulting from such fermentation is then filtered from the fermentation liquor. The mycelium is then broken up mechanically and the cell contents extracted with water, for example. The aqueous material thus obtained contains glucose oxidase. The glucose oxidase is generally recovered from such aqueous material by precipitation with ammonium sulfate. The resulting glucose oxidate-ammonium sulfate preciptate is separated from the liquid by filtration, for example, and is then redissolved in water. The resulting aqueous solution of glucose oxidase is a marketable item of commerce. Such aqueous solution of glucose oxidase, however, is contaminated with sulfate impurities which can be undesirable for some glucose oxidase uses, as discussed above.

In accordance with the present invention, purified glucose oxidase substantially free from sulfate impurities is obtained by a process which comprises adding to an aqueous solution of glucose oxidase a water-soluble calcium compound to precipitate a substantial amount of the sulfate impurities in the glucose oxidase solution, separating the calcium-precipitated sulfate impurities from the purified aqueous solution of glucose oxidase, adding to said purified solution a water-soluble barium compound to precipitate substantially all of the remainder of the sulfate impurities, and then separating the barium-precipitated sulfate impurities from the purified glucose oxidase solution.

Water-soluble calcium compounds useful in the present invention are exemplified by calcium acetate, calcium bromate, calcium bromide, calcium chlorate, calcium chloride, calcium chromate, calcium cyanide, calcium dithionate, calcium ferricyanide, calcium ferrocyanide, calcium formate, calcium hypophosphite, calcium iodide, calcium lactate, calcium nitrate, calcium nitrite, calcium perchlorate, calcium permanganate, calcium salicylate, calcium sulfhydrate, calcium thiocarbonate, calcium thiocyanate, calcium thiosulfate, and the like. The calcium compound employed should not contain an anion that will interfere with the activity of glucose oxidase. It is understood that the expression "calcium compound" can include a mixture of two or more water-soluble calcium compounds. Calcium chloride is the preferred compound to be used in the present invention since it is quite soluble and thus readily forms an insoluble precipitate with the sulfate impurities. It is also a relatively inexpensive material.

The water-soluble calcium compound is added conveniently in the form of a comminuted solid, but aqueous solutions of the water-soluble calcium compound can also be employed if desired. When an aqueous solution is employed, it is preferably in the form of a saturated solution in order to reduce the amount of solution required. The water-soluble calcium compound is generally added in an amount of from about 80 to about 130 weight percent of the stoichiometric amount to react with all the sulfate impurities present in the aqueous glucose oxidase solution. Preferably it is added in an amount of from about 90 to about 100 weight percent of the stoichiometric amount. It is not possible to remove all the sulfate impurities by addition of a calcium compound alone since some of the calcium sulfate precipitate that is formed will go back into solution in the presence of ammonium ions which are also present as impurities.

The reaction conditions for contacting the aqueous glucose oxidase solution with the water-soluble calcium compound are not narrowly critical. Normal ambient room temperature conditions (about 40° F.–80° F.) are employed and contact time of about 2–16 hours is convenient. Longer contact times can be used if desired. At temperatures above normal room temperature the contact time can be reduced and at temperatures below normal room temperature the contact time can be increased accordingly. At the conclusion of the desired contact time the calcium-precipitated sulfate impurities are separated from the purified glucose oxidase solution by convenient well known techniques, such as filtration, decantation after gravity settling, centrifugation and the like. The purified glucose oxidase solution is then ready to be treated with the water-soluble barium compound to remove the remaining amounts of sulfate impurities.

In order to obtain maximum removal of sulfate impurities by the process of the present invention, it is necessary that the calcium sulfate precipitate be removed from the aqueous glucose oxidase solution before adding the water-soluble barium compound. Otherwise, some of the barium compound will react with some of the calcium sulfate precipitate to form barium sulfate and liberate calcium ions. These calcium ions can then react with some of the remaining sulfate ions to form calcium sulfate, but such calcium sulfate will tend to dissolve due to the presence of ammonium ions and thus liberate the sulfate ions. If the calcium sulfate is removed prior to addition of the barium compound these sulfate ions would be effectively removed by the barium compound.

Water-soluble barium compounds useful in the present invention are exemplified by barium acetate, barium bromide, barium butyrate, barium chlorate, barium chloride, barium chloroplatinate, barium cyanide, barium dithionate, barium formate, barium hydroxide, barium hypophosphite, barium iodide, barium nitrate, barium hexanitride, barium nitrite, barium perchlorate, barium permanganate, barium persulfate, barium propionate, barium silicate, barium trisulfide, barium tetrasulfide, barium thiocyanate, and the like. The barium compound employed should not contain an anion that will interfere with the activity of glucose oxidase. It is understood that the expression "barium compound" can include a mixture of two or more water-soluble barium compounds. Barium chloride is a preferred compound to be used in the present invention since it has satisfactory solubility and thus readily forms an insoluble precipitate with the remaining sulfate impurities. It is also a relatively inexpensive material. A mixture of barium chloride and barium hydroxide is also preferably used. In such mixture the barium chloride: barium hydroxide molar ratio should be from about 15:1 to about 50:1.

The water-soluble barium compound is added conveniently in the form of a comminuted solid, but aqueous solutions of the water-soluble barium compound can also be employed if desired. When an aqueous solution is employed, it is preferably in the form of a saturated solution in order to reduce the amount of solution required. The water-soluble barium compound is preferably added in about 100 weight percent of the stoichiometric amount to react with all the sulfate impurities remaining in the aqueous glucose oxidase solution after treatment with the water-soluble calcium compound and subsequent removal of the calcium sulfate precipiate. Excess amounts of water-soluble barium compound can be used, if desired.

The reaction conditions for contacting the purified glucose oxidase solution with the water-soluble barium compound are the same as described above for use of the water-soluble calcium compound. At the conclusion of the desired contact time, the barium-precipitated sulfate impurities are separated from the purified glucose oxidase solution by convenient well known techniques. The resulting purified glucose oxidase solution is substantially free from sulfate impurities.

If a water-soluble barium compound is used alone or prior to the addition of the calcium compound to remove the sulfate impurities, the resulting large quantity of barium sulfate precipitate forms a bulky mass which is difficult to remove from the glucose oxidase solution, and it retains an undesirable amount of glucose oxidase by occlusion, entrapment or adsorption.

The amount of sulfate impurities present in the original aqueous glucose oxidase solution and in the purified glucose oxidase solution after treatment with water-soluble calcium salt can be determined by well known analytical procedures, such as gravimetric analysis. The determination of these amounts of sulfate is necessary in order to calculate the required amounts of water-soluble calcium compound and water-soluble barium compound to remove substantially all of the sulfate impurities.

If the water-soluble calcium and barium compound anions remaining in the purified glucose oxidase solution are undesirable, they can be conveniently removed by dialysis of the glucose oxidase solution by well known techniques.

The simplified process of the present invention is useful not only to remove substantially all sulfate impurities from glucose oxidase, but also to purify the glucose oxidase without losing appreciable amounts of the glucose oxidase. The amount of glucose oxidase recovered is calculated by dividing the total activity of the product (glucose oxidase units/ml. times total ml.) with the total activity of the starting material (glucose oxidase units/ml. times total ml.). Recoveries of as high as about 88 percent have been achieved with the present process while removing substantially all of the sulfate impurities. A glucose oxidase unit is well known in the enzyme art to represent the amount of glucose oxidase that will catalyze the oxidation of a glucose substrate containing 3.3 weight percent glucose monohydrate with 10 microliters of oxygen/min. at 35° C. and pH 5.1 over a 15 minute period.

The invention will be described in further detail in the following examples.

*Example 1*

An aqueous solution of glucose oxidase was obtained by well known techniques from the fermentation of *Aspergillus niger*. Such techniques included the use of ammonium sulfate to recover the glucose oxidase from the fermentation mycelium extract. This aqueous solution of glucose oxidase contained 83.23 mg./ml. of sulfate ions. To a 1-liter quantity of this aqueous glucose oxidase solution (containing 83.23 g. of sulfate ions) were added 90.0 g. of comminuted dry calcium chloride (93.5 weight percent of the stoichiometric amount to react with all the sulfate ions). The resulting mixture was maintained at a temperature of 45° F. for 4 hours. It was then mixed with 2 weight percent diatomaceous filteraid and then filtered to remove the calcium sulfate precipitate. The resulting 900 ml. of purified glucose oxidase solution was stored overnight at 45° F. This 900 ml. of solution contained 20.5 mg./ml. of sulfate ions (18.45 g. total sulfate). To 400 ml. of this solution were added 20.8 g. of $BaCl_2 \cdot 2H_2O$ (100 weight percent of stoichiometric amount to react with all the sulfate ions). This mixture then stood 15–16 hours at 45° F.–50° F. The mixture was then filtered using 2 weight percent diatomaceous filteraid to remove the barium sulfate precipitate. The 380 ml. of recovered filtrate contained 0.02 mg./ml. of sulfate ions (7.6 mg. total sulfate ions). The process of the present invention thus removed more than 99 weight percent of the total sulfate impurities in a simple and convenient manner. The original aqueous glucose oxidase solution contained 697 glucose oxidase units/ml. or 697,000 total units. The filtrate from the calcium chloride precipitation contained 763 units/ml. or 686,700 total units for a glucose oxidase recovery of 98.5 percent. The 380 ml. filtrate from the barium chloride precipitation contained 591 units/ml. or 505,305 units (if the entire 900 ml. filtrate from the calcium chloride precipitation were so treated) for an overall glucose oxidase recovery of 72.5 percent. The process of the present invention thus removed substantially all the sulfate impurities while enabling a high percentage of the original glucose oxidase activity to be recovered.

*Example 2*

A 400 ml. portion of the purified glucose oxidase solution resulting from the calcium chloride precipitation of Example 1 was mixed with 19.8 g. $BaCl_2 \cdot 2H_2O$ (95 weight percent of the stoichiometric amount to react with all the sulfate ions) and 1.35 g. $Ba(OH)_2 \cdot 8H_2O$ (5 weight percent of the stoichiometric amount to react with all the sulfate ions). The barium compounds were employed in a $BaCl_2:Ba(OH)_2$ molar ratio of 19:1. This mixture then stood 15–16 hours at 45° F.–50° F. The mixture was then filtered using 2 weight percent diatomaceous filteraid to remove the barium sulfate precipitate. The 380 ml. of recovered filtrate contained 0.05 mg./ml. of sulfate ions (19 mg. total sulfate ions). The process of the present invention thus removed more than 99 weight percent of the total sulfate impurities. The filtrate from the barium chloride-barium hydroxide precipitation contained 695 glucose oxidase units/ml. or 593,370 units (if the entire 900 ml. filtrate from the calcium chloride precipitation were so treated) for an overall glucose oxidase recovery of 85.1 percent.

*Example 3*

To a 1-liter quantity of aqueous glucose oxidase solution described in Example 1 (containing 83.23 g. of sulfate ions) were added 110 g. of comminuted dry calcium chloride (114 weight percent of the stoichiometric amount to react with all the sulfate ions). The resulting mixture was maintained at 45° F.–50° F. for 15–16 hours. It was then filtered using 2 weight percent diatomaceous filteraid to remove the calcium sulfate precipitate. The resulting 880 ml. of purified glucose oxidase solution was stored overnight at 45° F.–50° F. This 880 ml. of solution contained 8.90 mg./ml. sulfate ions (7.83 g. of total sulfate). To 400 ml. of this solution were added 9.06 g. of $BaCl_2 \cdot 2H_2O$ (100 weight percent of the stoichiometric amount to react with all the sulfate ions). This mixture then stood overnight at 45° F.–50° F. The mixture was then filtered using 2 weight percent diatomaceous filteraid to remove the barium sulfate precipitate. The 380 ml. of recovered filtrate contained 0.04 mg./ml. of sulfate ions (0.015 g. of total sulfate). Over 99 weight percent of the total sulfate impurities were thus removed. The original aqueous glucose oxidase solution contained 697 glucose oxidane units/ml. or 697,000 total units. The filtrate from the calcium chloride precipitation contained 744 units/ml. or 654,000 total units for a glucose oxidase recovery of 93.9 percent. The 380 ml. filtrate from the barium chloride precipitation contained 719 units/ml. or 601,084 units (if the entire 880 ml. filtrate from the calcium chloride precipitation were so treated) for an overall glucose oxidase recovery of 86.2 percent.

*Example 4*

A 400 ml. portion of the purified glucose oxidase solution resulting from the calcium chloride precipitation of Example 3 was mixed with 8.61 g. $BaCl_2 \cdot 2H_2O$ (95 weight percent of the stoichiometric amount to react with all the sulfate ions) and 0.58 g. $Ba(OH)_2 \cdot 8H_2O$ (5 weight percent of the stoichiometric amount to react with all the sulfate ions). The barium compounds were employed in a $BaCl_2:Ba(OH)_2$ molar ratio of 19:1. This mixture then stood overnight at 45° F.–50° F. The mixture was then filtered using 2 weight percent diatomaceous filteraid to remove the barium sulfate precipitate. The 380 ml. of recovered filtrate contained 0.07 mg./ml. of sulfate ions (36.6 mg. total sulfate ions). The process of the present invention thus removed more than 99 weight percent of the total sulfate impurities. The filtrate from the barium chloride-barium hydroxide precipitation contained 734 glucose oxidase units/ml. or 613,624 units (if the entire 880 ml. filtrate from the calcium chloride precipitation were so treated) for an overall glucose oxidase recovery of 88.0 percent.

*Example 5*

An aqueous solution of glucose oxidase was obtained by well known techniques from the fermentation of *Aspergillus niger*. Such techniques included the use of ammonium sulfate to recover the glucose oxidase from the fermentation mycelium extract. This aqueous solution of glucose oxidase contained 92.02 mg./ml. of sulfate ions. To a 1-liter quantity of this aqueous glucose oxidase solution (containing 92.02 mg./ml. of sulfate ions) were added 90.0 g. of comminuted dry calcium chloride (84.7 weight percent of the stoichiometric amount to react with all the sulfate ions). The resulting mixture was maintained at 45° F.–50° F. for 15–16 hours. It was then mixed with 2 weight percent diatomaceous filteraid and then filtered to remove the calcium sulfate precipitate. The resulting 880 ml. of purified glucose oxidase solution was stored overnight at 45° F.–50° F. This 880 ml. of solution contained 28.6 mg./ml. of sulfate ions (25.17 g. total sulfate). To 400 ml. of this solution were added 29.1 g. of $BaCl_2 \cdot 2H_2O$ (100 weight percent of stoichiometric amount to react with all the sulfate ions). After standing overnight at 45° F.–50° F., the glucose oxidase solution was filtered with 2 weight percent diatomaceous filteraid to remove the barium sulfate precipitate. The 345 ml. of recovered filtrate contained 0.46 mg./ml. of sulfate ions (0.16 g. total sulfate). The process of the present invention thus removed over 99 weight percent of the sulfate impurities.

*Example 6*

An aqueous solution of glucose oxidase was obtained by well known techniques from the fermentation of *Aspergillus niger*. Such techniques included the use of ammonium sulfate to recover the glucose oxidase from the fermentation mycelium extract. This aqueous solution of glucose oxidase contained 46.9 mg./ml. of sulfate ions. To a 60 ml. portion of this solution (2.82 g. total sulfate) were added 6.45 g. of comminuted calcium acetate (125 weight percent of the stoichiometric amount to react with all the sulfate ions). The resulting mixture stood overnight at 45° F.–50° F. It was then mixed with 2 weight percent diatomaceous filteraid and then filtered to remove the calcium sulfate precipitate. The resulting filtrate contained 2.4 mg./ml. sulfate ions indicating substantial sulfate removal. This filtrate can then be treated with barium compounds to complete the sulfate removal as described in the foregoing examples.

*Example 7*

The procedure of Example 6 was repeated employing 8.60 g. of $Ca(NO_3)_2 \cdot 4H_2O$ to mix with the 60 ml. of aqueous glucose oxidase (124 weight percent of the stoichiometric amount to react with all the sulfate ions). The resulting filtrate product contained 2.0 mg./ml. sulfate ions indicating substantial sulfate removal. This filtrate can then be treated with barium compounds to complete the sulfate removal as described in the foregoing examples.

The purified glucose oxidase solution obtained by the process of the present invention is especially useful in diagnostic tests for determining glucose in body fluids, such as blood and urine. It is also useful in all known applications for glucose oxidase.

In summary, the present invention resides in a process of producing glucose oxidase that is substantially free of sulfate impurities by contacting an aqueous glucose oxidase solution with a water-soluble calcium compound to precipitate substantially all of the sulfate impurities, separating the calcium sulfate precipitate from the purified glucose oxidase solution, contacting the purified glucose oxidase solution with a water-soluble barium compound to precipitate substantially all of the remaining sulfate impurities, and then separating the barium sulfate precipitate from the purified glucose oxidase solution.

What is claimed is:

1. A process for purifying glucose oxidase which comprises adding to an aqueous solution of glucose oxidase a water-soluble calcium compound to precipitate a substantial amount of the sulfate impurities in the glucose oxidase solution, separating the calcium-precipitated sulfate impurities from the purified aqueous solution of glucose oxidase, adding to said purified solution a water-soluble barium compound to precipitate substantially all of the remainder of the sulfate impurities, and then separating the barium-precipitated sulfate impurities from the purified glucose oxidase solution.

2. A process according to claim 1 wherein the water-soluble calcium compound is calcium chloride.

3. A process according to claim 1 wherein the water-soluble barium compound is barium chloride.

4. A process according to claim 1 wherein the water-soluble barium compound is a mixture of barium chloride and barium hydroxide.

5. A process according to claim 1 wherein the water-soluble calcium compound is calcium chloride and the water-soluble barium compound is barium chloride.

6. A process according to claim 1 wherein the water-soluble calcium compound is calcium chloride and the water-soluble barium compound is a mixture of barium chloride and barium hydroxide.

7. A process according to claim 1 wherein the water-soluble barium compound is a mixture of barium chloride and barium hydroxide having a barium chloride:barium hydroxide molar ratio of from about 15:1 to about 50:1.

8. A process according to claim 1 wherein the water-soluble calcium compound is added in an amount of from about 80 to about 130 weight percent of the stoichiometric amount to react with all of the sulfate impurities in the aqueous glucose oxidase solution.

9. A process according to claim 1 wherein the water-soluble barium compound is added in a stoichiometric amount to precipitate the sulfate impurities remaining in the aqueous glucose oxidase solution after treatment with the water-soluble calcium compound and separation of the calcium sulfate precipitate.

10. A process according to claim 1 wherein the water-soluble calcium compound is added in an amount of from about 80 to about 130 weight percent of the stoichiometric amount to react with all of the sulfate impurities in the aqueous glucose oxidase solution, and the water-soluble barium compound is added in a stoichiometric amount to precipitate the sulfate impurities remaining in the aqueous glucose oxidase solution after treatment with the water-soluble calcium compound and separation of the calcium sulfate precipitate.

11. A process according to claim 1 wherein the water-soluble calcium compound is added in an amount of from about 90 to about 100 weight percent of the stoichiometric amount to react with all of the sulfate impurities in the aqueous glucose oxidase solution.

12. A process according to claim 1 wherein the water-soluble calcium compound is calcium acetate.

13. A process according to claim 1 wherein the water-soluble calcium compound is calcium nitrate.

References Cited by the Examiner

UNITED STATES PATENTS 3,134,723   5/1964   Corman _____ 195—66

A. LOUIS MONACELL, *Primary Examiner.*

L. M. SHAPIRO, *Assistant Examiner.*